United States Patent Office 3,786,014
Patented Jan. 15, 1974

3,786,014
ELECTROCOATABLE PAINT CONTAINING NON-FERROMAGNETIC CHROMIUM OXIDE
Danvers Allin Swales, Harrogate, and John William Carson, Leeds, England, assignors to Albright & Wilson Limited, Oldbury, near Birmingham, Warwickshire, England
No Drawing. Filed Aug. 24, 1970, Ser. No. 66,602
Claims priority, application Great Britain, Aug. 22, 1969, 42,026/69
Int. Cl. C09c 1/34; C23b 13/00
U.S. Cl. 260—29.2 R
9 Claims

ABSTRACT OF THE DISCLOSURE

A paint composition suitable for electrodeposition contains a non-ferromagnetic oxide of chromium intermediate between $CrO_3$ and $Cr_2O_3$. Intermediate oxides of chromium may be painted onto corrosible metals to inhibit corrosion.

---

The present invention relates to improved pigments and to coating compositions containing them.

The invention concerns coating compositions of the type which comprise an inorganic pigment, a resinous binder and a volatile liquid diluent, which coating compositions are hereinafter referred to as "paints." The invention is particularly valuable, according to one embodiment in connection with paints which are suitable for application by electrodeposition. Electrodeposition of paint involves immersing the workpiece in a bath containing the dilute paint and then rendering the workpiece anodic with respect to at least one electrode in the bath, whereupon the paint is deposited by electrophoretic action.

The pigments to which the invention relates are also valuable in stoving paints, which are applied to a metal substrate and heated; typically at temperatures in the range 100° C. to 200° C.

We have discovered that certain oxides of chromium which are intermediate in composition between $Cr_2O_3$ and $CrO_3$ may advantageously be used as pigments in paints. Our invention therefore concerns paints containing as pigment an intermediate oxide, or mixture of intermediate oxides, of chromium. By "intermediate oxide of chromium" is meant herein an oxide or hydrated oxide of chromium having more than 1.5 and less than 3 atoms oxygen per atom of chromium in the molecule thereof. Examples of intermediate oxides of chromium include $Cr_3O_8$, $Cr_2O_5$, $Cr_5O_{12}$ and $CrO_2$. The term also includes hydrated intermediate oxides. The intermediate oxides are conveniently prepared by heating $Cr_2O_3$ or hydrated chromic oxide with $CrO_3$ at temperatures in the range 100 to 500° C. and preferably at elevated pressure (e.g. 2 to 40 atmospheres) in the presence of water vapor.

According to a first embodiment, the invention provides a paint, suitable for electrodeposition, which comprises a non-ferromagnetic intermediate oxide or mixture of intermediate oxides of chromium, a resinous binder soluble in water at alkaline pH, water and a volatile water soluble base.

The pigment according to this embodiment of our invention comprises at least one intermediate oxide of chromium, which is non-ferromagnetic. It has been found that when intermediate oxides of chromium are prepared by heating trivalent chromium compounds with hexavalent chromium compounds in certain proportions and at temperatures in the upper part of the range a proportion of the product is formed as $CrO_2$ with a crystal structure analogous to rutile. The "rutile" type of $CrO_2$ is ferromagnetic and is generally unsuitable for use according to the first embodiment of our invention. In particular "rutile" type $CrO_2$ cannot be electrodeposited satisfactorily on account of its ferromagnetic properties. It is therefore preferred when preparing pigments for use according to the first embodiment to avoid conditions which will give rise to the formation of "rutile" type $CrO_2$, for example by operating at temperatures below 300° C. and by avoiding stoichiometric proportions for the production of $CrO_2$. It is, however, possible to prepare chromium oxides under conditions adapted to give a proportion of $CrO_2$ in the rutile habit, together with other oxides, and to separate the "rutile" type $CrO_2$ from the other oxides, for example by magnetic means.

The intermediate oxide is most conveniently formed, therefore, by heating trivalent chromium compounds such as $Cr_2O_3$ or hydrated chromic oxide with hexavalent chromium such as $CrO_3$ in a proportion of trivalent to hexavalent chromium equivalent to from 15% $Cr_2O_3$:85% $CrO_3$ to 67% $Cr_2O_3$:33% $CrO_3$ by weight, and in the presence of from 0 to 50% added water in an autoclave at a temperature of 100 to 500° C. and a pressure of 2 to 40 atmospheres, and if necessary separating any ferromagnetic material by magnetic means.

The non-ferromagnetic intermediate oxides provide a valuable dark pigment which is generally black, may be electrodeposited and is capable of providing a useful corrosion inhibiting coating. The pigment used according to our invention may contain minor proportions of chromic oxide, hydrated chromic oxide or chromium trioxide in addition to the intermediate oxides. However, if it is to be electrodeposited, the pigment should preferably have a water solubility of less than 0.02% by weight.

Our invention, therefore, according to a second embodiment provides a method of forming corrosion inhibiting coatings which comprises applying a paint containing at least one intermediate oxide of chromium to a corrosible substrate. Preferably the painted substrate is heated at a temperature of 100 to 250° C. The paint for use according to the second embodiment of our invention may be applied by any convenient means, e.g. brushing, spraying, or electrodeposition.

The paints with which the invention is concerned may contain additional pigments in admixture with the chromium oxides. Preferred compositions comprise other metal oxides, which are capable of reacting with $CrO_3$ to form sparingly water soluble chromates on stoving, for example zinc oxide, calcium oxide or lead oxides.

Where the paint is intended to be electrodeposited, we prefer that the binder should be an acidic resin which is soluble in aqueous alkali, e.g. a phenolic alkyd resin. The diluent is then preferably water containing a volatile base, such as ammonia, or an amine or other organic base, the formulation preferably having a pH of from 7.8 to 8.0. The diluent may additionally contain organic solvents.

Typically the intermediate chromium oxide is employed in a proportion of from 0.1 to 50% (e.g. from 0.5% to 10%) of the weight of the nonvolatile matter in the paint. These proportions are not, however, critical and may be varied according to the type of paint and the nature of the binder. Paints are often sold as concentrates which may be diluted, for example with water, prior to use. Our invention includes such concentrates. For this reason the proportion of diluent may be varied considerably without departing from the invention; e.g. a paint concentrate according to the invention typically contains up to 70% by weight of nonvolatile material and preferably from 40 to 60% by weight. If the paint is to be electrodeposited, the bath is usually diluted to provide at least 5%, for example, 10 to 25% total non-volatile material by weight. If the paint is to be electrodeposited, it is preferred that the content of ionic salts should be as low as is practicable.

The invention is illustrated by the following examples.

EXAMPLE 1

A mixture of 53% by weight of $CrO_3$ and 20% by weight $Cr_2O_3$ and 27% by weight water was autoclaved at 260° C. and 400 p.s.i. in a glass container inside a steel autoclave. The product so obtained after being thoroughly washed and dried at a temperature not above 100° C. was used in the following anticorrosive electrodeposition primer formulation in which all parts are expressed as weight percent:

| | |
|---|---|
| Red iron oxide (low soluble salts) | 9.6 |
| Colloidal silica | 1.2 |
| Intermediate chromium oxide | 1.0 |
| Phenolic alkyd resin (ammonia based) | 43.3 |
| Butyl ether of ethylene glycol | 2.9 |
| Water (distilled) | 42.0 |

The pH was controlled to 7.8-8.0 by addition of ammonia and this concentrate was diluted with distilled water before use to 10-15% solids.

The paint was electrodeposited on a mild steel substrate. After rinsing the painted steel was stoved at 160° C. for 30 minutes.

EXAMPLE 2

A mixture of $CrO_3$, $CrO_2$, $Cr_2O_3$ and water in the proportions 53:20:27 was autoclave at 260° C. and 400 p.s.i. in a glass container inside a steel autoclave. The product so obtained was used in the following anticorrosive stoving primer.

| | Percent by wt. |
|---|---|
| Red iron oxide | 13.5 |
| Barytes | 22.2 |
| Calcium carbonate | 4.8 |
| Intermediate oxide | 2.9 |
| Medium length dehydrated castor alkyd resin (50% NV) | 23.0 |
| Unmodified butylated urea-formaldehyde (60% NV) resin | 3.9 |
| Xylene | 29.7 |

The paint was applied by spraying and stoved at 120° C. for 30 mins.

The examples were compared with similar formulations containing no intermediate oxides, after exposure to salt spray for 500 hours. The examples of the invention were relatively uncorroded, while the controls were heavily blistered and corroded.

We claim:

1. In an alkaline aqueous paint composition suitable for electrodeposition which consists essentially of a resinous binder soluble in water at alkaline pH, water, and a volatile water soluble base the improvement comprising incorporating at least one oxide of chromium which is non-ferromagnetic and which has a proportion of chromium to oxygen corresponding to that in an admixture of from 67% $Cr_2O_3$:33% $CrO_3$ to 15% $Cr_2O_3$:85% $CrO_3$ by weight in said bath as a pigment.

2. A composition according to claim 1 wherein the oxide of chromium is selected from the group consisting of $Cr_3O_8$, $Cr_2O_5$, $Cr_5O_{12}$ and $CrO_2$ in a non-rutile habit.

3. A composition according to claim 8 wherein the oxide of chromium comprises from 1-50% by weight of the total non-volatile components of the paint.

4. A composition according to claim 2 wherein the resinous binder is a phenolic alkyd resin.

5. A composition according to claim 2 wherein the base is ammonia.

6. A composition according to claim 2 wherein the base is a volatile organic amine.

7. A composition according to claim 8 having a pH of from 7.8-8.0.

8. A composition according to claim 2 wherein the non-volatile material comprises up to 70% by weight and at least 5% by weight of the total composition.

9. A paint composition suitable for electrodeposition which consists essentially of (i) a phenolic alkyd resin which is soluble in water at a pH between 7.8 and 8.0, (ii) water, (iii) ammonia, and (iv) a pigment having a water solubility less than 0.2% by weight comprising at least one oxide of chromium which is non-ferromagnetic and which is selected from the group consisting of $Cr_3O_8$, $Cr_2O_5$, $Cr_5O_{12}$ and $CrO_2$ in a non-rutile habit, said pigment comprising from 0.1% to 50% of the non-volatile matter in the said paint composition and said non-volatile matter comprising up to 70% by weight and at least 5% by weight of the total composition; and said ammonia being present in an amount sufficient to provide a pH of from 7.8 to 8.0.

References Cited

UNITED STATES PATENTS

| | | | |
|---|---|---|---|
| 2,416,064 | 2/1947 | Patterson et al. | 106—302 |
| 3,065,095 | 11/1962 | Foos et al. | 106—302 |
| 3,362,899 | 1/1968 | Gilchrist | 204—181 |
| 3,532,613 | 10/1970 | Gilchrist | 204—181 |
| 3,576,728 | 4/1971 | Smith et al. | 204—181 |

OTHER REFERENCES

Mattiello: "Protective and Decorative Coatings," vol. II, 1942, pp. 21 and 22.

PAUL LIEBERMAN, Primary Examiner

A. H. KOECKERT, Assistant Examiner

U.S. Cl. X.R.

106—302; 204—181; 260—29, 4 R; 423—607